(12) United States Patent
Mayama

(10) Patent No.: US 7,213,801 B2
(45) Date of Patent: May 8, 2007

(54) VIBRATION DAMPING APPARATUS FOR SUPPORTING ENGINE ON VEHICULAR BODY

(75) Inventor: Akihiro Mayama, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 28 days.

(21) Appl. No.: 10/171,646

(22) Filed: Jun. 17, 2002

(65) Prior Publication Data

US 2002/0195759 A1 Dec. 26, 2002

(30) Foreign Application Priority Data

Jun. 25, 2001 (JP) .............................. 2001-190672

(51) Int. Cl.
*F16F 1/38* (2006.01)
(52) U.S. Cl. .............................. 267/140.13; 267/141.7; 267/141.3
(58) Field of Classification Search ................. 62/295, 62/296, 297; 417/363; 267/140.4, 140.3, 267/140.5, 219, 141, 140.12, 140.11, 141.2, 267/141.3, 141.4, 141.5, 141.7, 140.13; 180/299
See application file for complete search history.

(56) References Cited

U.S. PATENT DOCUMENTS

| | | | | |
|---|---|---|---|---|
| 4,974,818 A | * | 12/1990 | Kato | 267/140.13 |
| 5,009,404 A | * | 4/1991 | Hirazawa | 267/140.13 |
| 5,178,374 A | * | 1/1993 | Maeno | 267/140.13 |
| 5,295,671 A | * | 3/1994 | Nakagaki et al. | 267/140.13 |
| 5,560,592 A | * | 10/1996 | Shimoda et al. | 267/140.13 |
| 5,636,826 A | * | 6/1997 | Nakagaki et al. | 248/562 |
| 5,651,535 A | * | 7/1997 | David | 267/140.5 |
| 5,704,598 A | * | 1/1998 | Kojima | 267/140.13 |
| 5,788,207 A | * | 8/1998 | Bunker | 248/634 |
| 5,895,031 A | * | 4/1999 | Meyer et al. | 267/140.12 |
| 5,971,376 A | * | 10/1999 | Mori et al. | 267/140.13 |
| 6,120,011 A | * | 9/2000 | Maeno et al. | 267/140.11 |
| 6,439,555 B2 | * | 8/2002 | Takashima et al. | 267/140.13 |

FOREIGN PATENT DOCUMENTS

| JP | 07-158696 | * | 6/1995 |
|---|---|---|---|
| JP | 11-165542 | * | 6/1999 |

* cited by examiner

*Primary Examiner*—James McClellan
*Assistant Examiner*—Bradley T. King
(74) *Attorney, Agent, or Firm*—Foley & Lardner LLP

(57) ABSTRACT

In a vibration damping apparatus for supporting an engine on a vehicular body, an elastic member damps a vibration developed from the engine, a stopper is brought in contact with the elastic member to limit a transmission of a fluctuation developed on the engine therethrough, and a vehicular body support member integrated with the elastic member to fix the elastic member on the vehicular body, the elastic member including a stopper fixing portion placed at a first position opposite to a second position faced toward the engine to fix the stopper at the first position and the stopper including a bending portion, one side thereof with respect to the bending portion being fixed onto the engine and the other side thereof with respect thereto being fixed onto the stopper fixing portion of the elastic member so as to grasp the elastic member between both sides of the stopper.

9 Claims, 5 Drawing Sheets

VIBRATION DAMPING APPARATUS FOR SUPPORTING ENGINE ON VEHICULAR BODY

BACKGROUND OF THE INVENTION

1. Field of the Invention

The present invention relates generally to a vibration damping apparatus for supporting an engine to a vehicular body such as an engine mount and, more particularly, relates to a stopper structure of the vibration damping apparatus.

2. Description of the Related Art

A stopper of a previously proposed vibration damping apparatus serves to limit a fluctuation of an engine when an elastic body whose inner side is reinforced by an iron plate or so forth is brought in contact with (or struck on) the stopper against a large fluctuation in a rolling of the engine during a start of the engine. However, this stopper has adopted a structure of receiving a load imposed due to a contact of the stopper with the elastic body in a cantilever arm (a beam supported only one end or one tip of a bending portion not fixed). Hence, if an engine drive torque is raised due to an increase in output of the engine, the stopper tends to yield according to a heavy load imposed due to a strike of the stopper against the elastic body. Hence, a limitation of the fluctuation of the engine becomes insufficient due to the yield of the stopper. In order to provide a sufficient limitation of the fluctuation of the engine, an increase in a thickness of the stopper can be considered.

SUMMARY OF THE INVENTION

However, since the increase in the thickness of the stopper causes a further problem of an increase of a weight of the stopper and a difficulty in making a bend forming. Furthermore, large mounts of labor hour and labor cost are required to determine an optimum form of the stopper which can suppress the above-described further problem.

It is, hence, an object of the present invention to provide a vibration damping apparatus for supporting an engine on a vehicular body which can sufficiently limit a large fluctuation in a rolling direction of the engine during a start of the vehicle without increasing the thickness of the stopper.

The above-described object can be achieved by providing a vibration damping apparatus for supporting an engine on a vehicular body, comprising: an elastic member to damp a vibration developed from the engine; a stopper brought in contact with the elastic member to limit a transmission of a fluctuation developed on the engine therethrough; and a vehicular body support member integrated with the elastic member to fix the elastic member on the vehicular body, the elastic member including a stopper fixing portion placed at one position opposite to the other position thereof faced toward the engine to fix the stopper at the first position and the stopper including a bending portion, one side thereof with respect to the bending portion being fixed onto the engine and the other side thereof with respect thereto being fixed onto the stopper fixing portion of the elastic member so as to grasp the elastic member between both sides of the stopper.

The above-described object can also be achieved by providing a vibration damping apparatus for supporting an engine on a vehicular body, comprising: an elastic member to damp a vibration developed from the engine; a second engine support member integrated with a stopper, the stopper being brought in contact with the elastic member to limit a transmission of a fluctuation developed on the engine therethrough and the second engine support member being interposed between the engine and the elastic member; and a vehicular body support member integrated with the elastic member to fix the elastic member on the vehicular body, the elastic member including a stopper fixing portion to fix the stopper integrated with the second engine support member thereon and placed on an opposing position to a position thereof faced toward the engine and the stopper including a bending portion via which the stopper is fixed onto the stopper fixing portion of the elastic member This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1A:
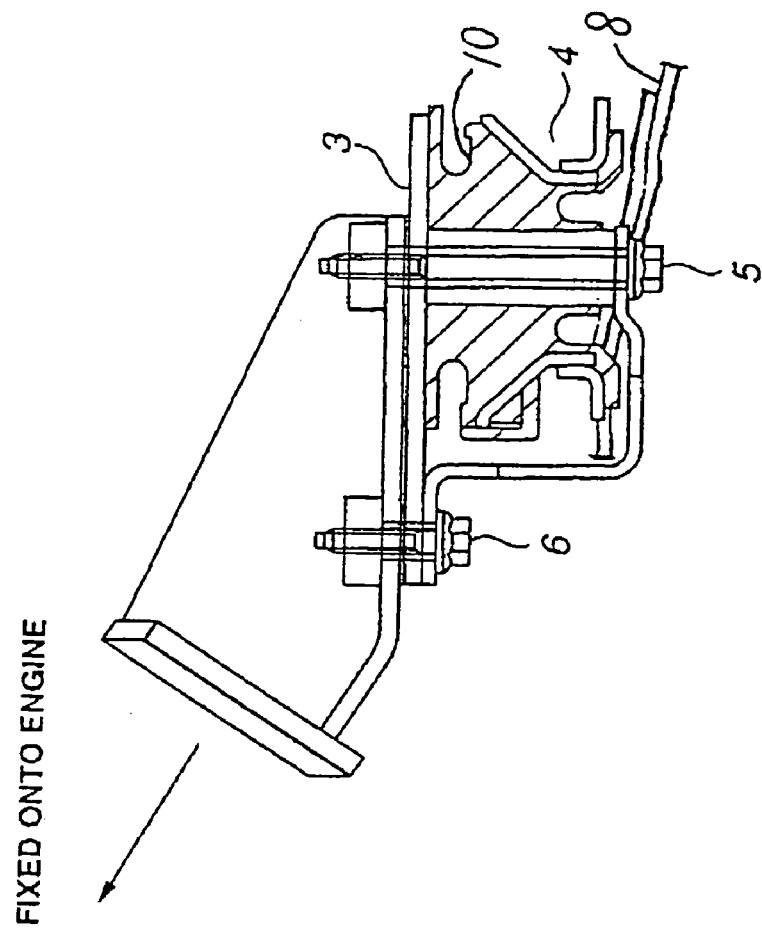
FIGS. 1A and 1B are a side view and a cross sectional view of a vibration damping apparatus for supporting an engine on a vehicular body in a first preferred embodiment according to the present invention, FIG. 1B being the cross sectional view cut away along a line of A—A in FIG. 1A.
Figure 1B:
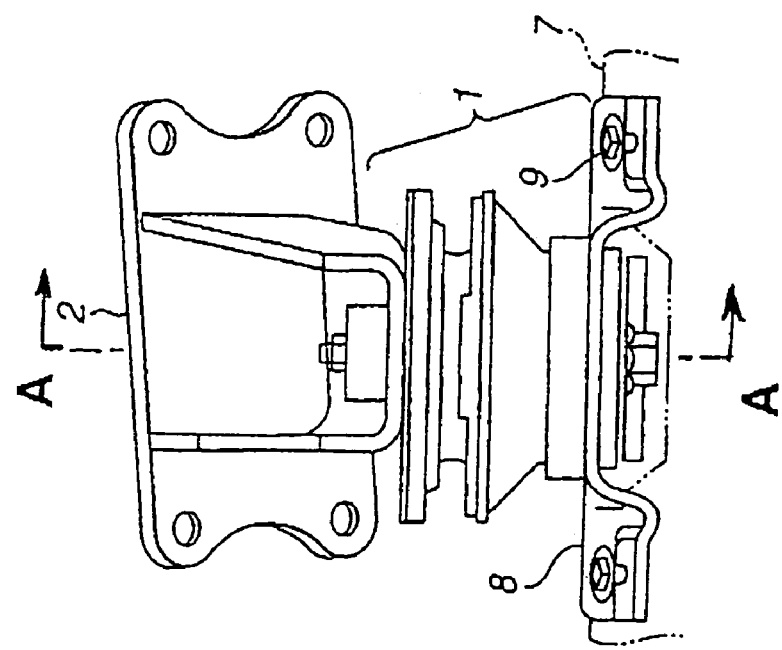

FIGS. 1A and 1B show a first preferred embodiment of a vibration damping apparatus for supporting an engine on a vehicular body according to the present invention. FIG. 1A is a side view of the vibration damping apparatus in the first embodiment mounted in a vehicle. FIG. 1B is a cross sectional view of the vibration damping apparatus cut away along a line of A—A shown in FIG. 1A.

In FIGS. 1A and 1B, an, so-called, engine mount 1 (or vibration damping support device) is interposed between an engine support bracket 2 (namely, a first engine support member) and a vehicular body fixed bracket 8 (namely, a vehicular body side supporting member). In addition, a stopper 3 is provided, a rubber assembly 4 (or an elastic member), a bolt 5, bolts 6 and 9, and a vehicular body part 7 are provided. Engine support bracket 2 has one side engaged with engine via bolts (not shown in FIGS. 1A and 1B) to fix bracket 2 onto the engine and the other side engaged with engine mount 1 to be mounted onto the engine. Thus, engine support bracket 2 is interposed between the engine and engine mount 1 to serve as a bridge of a mutual coupling thereof. Vehicular body side part 7 is a vehicular body or a suspension member fixed on the vehicular body. Engine mount 1 is fixed by a bolt engagement onto the vehicular body side part 7 at a side thereof different from a side at which engine mount 1 is fixed onto bracket 2. As described above, engine mount 1 provides a basic function of supporting a weight of the engine between bracket 2 connected to the engine and vehicular body side part 7. On the other hand, engine mount 1 is roughly divided into stopper 3, rubber assembly 4, and vehicular body side fixed bracket 8. Engine mount 1 is coupled to bracket 2 by means of bolts 5 and 6 via stopper 3. Vehicular body side fixed bracket 8 integrated to rubber assembly 4 by means of an adhesion by vulcanization serves to fix engine mount 1 onto the vehicular body side part 7 by means of engagement of bolt 9, as shown in FIGS. 1A and 1B.

Figure 2:
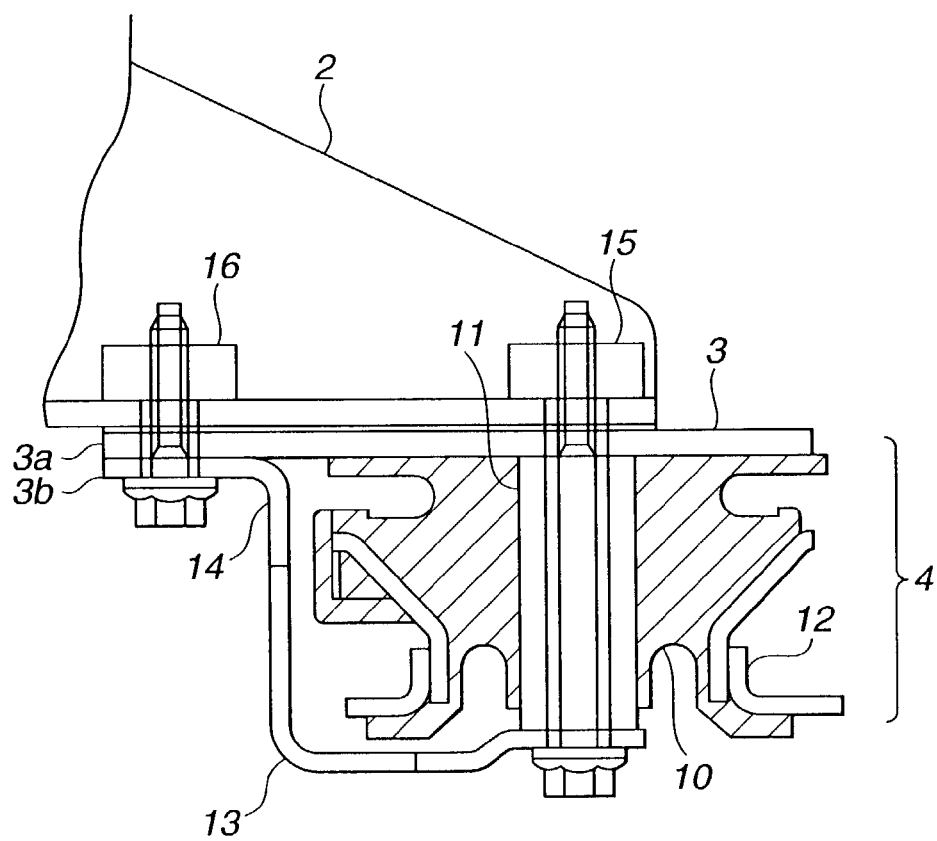
FIG. 2 is a partially cross sectional view of an essential part of the vibration damping apparatus in the first embodiment shown in FIGS. 1A and 1B in the same way as cutting along a line of A—A shown in FIG. 1B.

FIG. 2 shows an enlarged view of the cross sectional view of FIG. 1B.

In FIG. 2, a reference numeral 10 denotes a rubber of rubber assembly 4 (an elastic body), a reference numeral 11 denotes a pipe, a reference numeral 12 denotes a reinforcement fitting, a reference numeral 13 denotes a bending portion (a first bending portion), a reference numeral 14 denotes a bending portion (a second bending portion), a reference numeral 15 denotes a welding nut (a first fixing portion), and a reference numeral 16 denotes a welding nut (a second fixing portion). Reference numerals 3a and 3b denote upper and lower iron plates constituting stopper 3 by the integration thereof. Rubber assembly 4 includes rubber 10, pipe 11 integrated with rubber 10 by means of the adhesion by vulcanization, and reinforcement (metal) fitting 12, as shown in FIG. 2. Pipe 11 is installed to hold an engagement axle force by means of the engagement with bolt 5. Stopper 3 is constituted by iron plate 3a positioned so as to face with bracket 2 and bending portions 13 and 14 by means of a stamping, iron plate 3b positioned on a lower portion of iron plate 3a being integrated with iron plate 3a by means of a welding or so forth. Iron plate 3b constituting stopper 3 is bent through a right angle at a bending portion 13 and, thereafter, is fixed to an end surface of pipe 11 by means of the welding at an end portion opposite to a side at which iron plate 3b is fixed to iron plate 3a by means of the welding. In addition, iron plates 3a and 3b constituting stopper 3 are fixed to welding nut 15 equipped on bracket 2 by means of the engagement of bolt 5 with pipe 11 grasped between two iron plates 3a and 3b. Apart from welding nut 15, bracket 2 is provided with another welding nut 16 to fix the mutually integrated iron plates 3a and 3b by means of the engagement of bolt 6 onto bracket 6.

Figure 3:
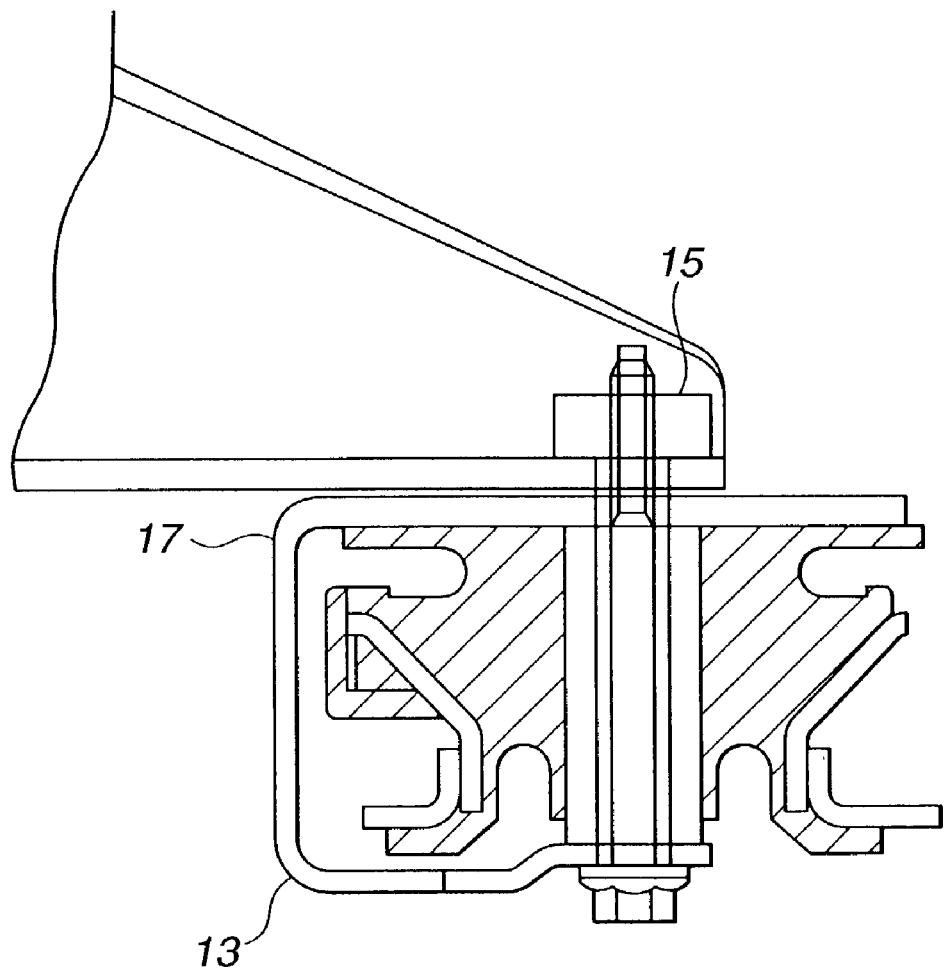
FIG. 3 is a partial cross sectional view of the essential part of the vibration damping apparatus in a second preferred embodiment according to the present invention at the same position as shown in FIG. 2.

Next, an operation of the vibration damping apparatus in the first embodiment will be described below. In order to explain a bending moment acted upon a first bending portion 13, suppose, herein, a case in which stopper 3 is fixed only at a single position of welding nut 15 onto bracket 2, as shown in FIG. 3. This case is a second embodiment of the vibration damping apparatus according to the present invention. It is noted that, in FIG. 3, a reference numeral 17 denotes a bending portion of stopper 3 and corresponds to the bending portion bent at a position of reference numeral 14 described in the first embodiment in an opposite direction to the bent direction at the bending portion 14 in the first embodiment.

Figure 4:
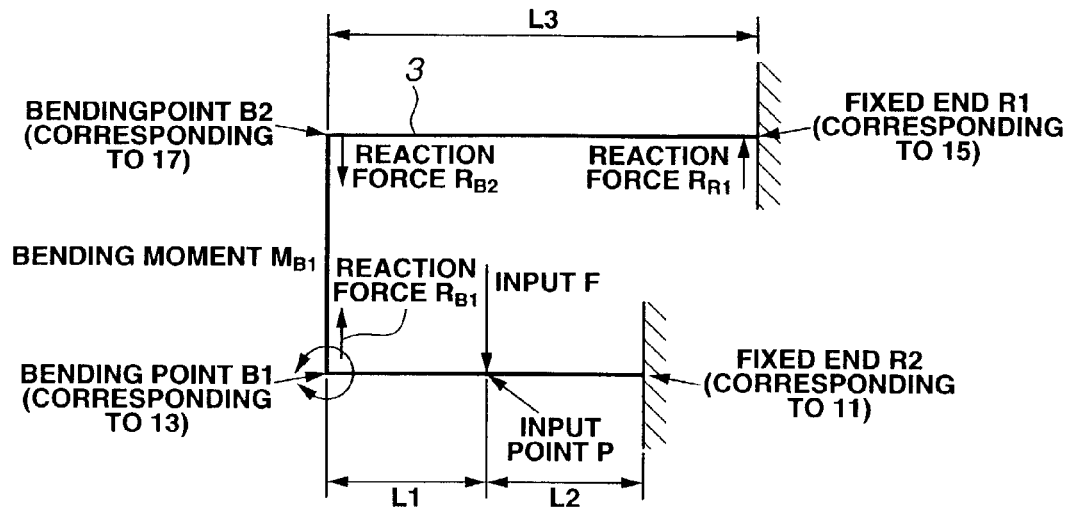
FIG. 4 is a model view of an essential part of the vibration damping apparatus in the second preferred embodiment according to the present invention shown in FIG. 3.

In order to discuss theoretically a bending moment acted upon bending portion 13, in the second embodiment, the bending moment is supposed from a model view with stopper 3 supposed to be the beam as shown in FIG. 4. Suppose that a fixing portion at which stopper 3 is fixed onto welding nut 15 is a fixed end R1, a portion of stopper 3 opposite to fixed end R1 at which stopper 3 is fixed to pipe 11 is a fixed end R2, bending portion 13 is a bending point B1, bending portion 17 is a bending point B2, a position in a midway through bending point B1 and fixed end R2 at which rubber 10 is contacted with stopper 8 is an input point P, and a force generated there at is an input F. Suppose, then, that input point P is positioned in a midway through bending point B1 and fixed end R2 and at a position dividing a distance from bending point B1 to fixed end into distances L1 and L2. Suppose that the bending moment acted upon bending point B1 is $M_{B1}$. According to a formula of the beam in a field of a strength of materials, $$M_{B1} = F \times \{(L1 + L2^2)/(L1 + L2)^2\} \qquad (1)$$
$$= F \times L1 \times \{L2/(L1 + L2)\}^2.$$

Notice $(L2/L1 + L2)$.

That is to say, $\{L2/(L1+L2)\}<1$ - - - (2). Hence, according to equations (1) and (2), $M_{B1}<F \times L1$ - - - (3).

Figure 7:
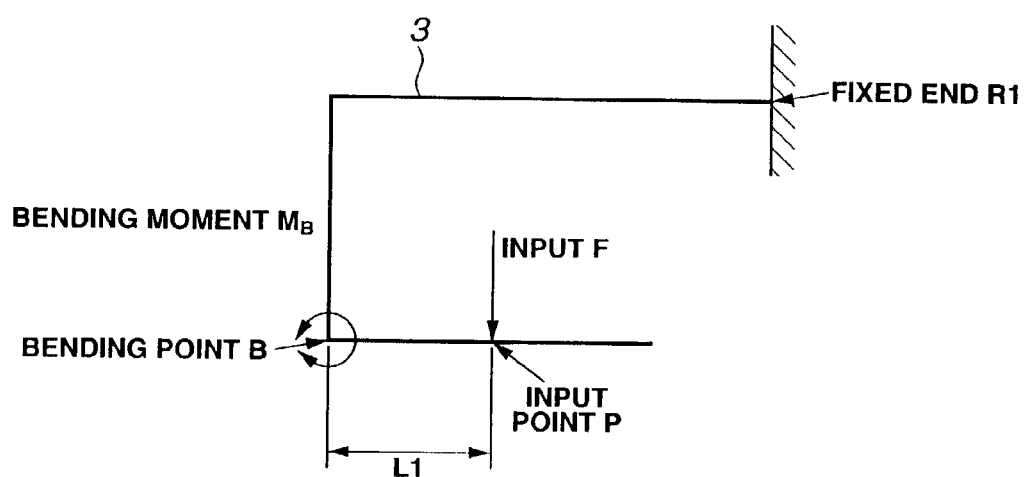
FIG. 7 is a model view of the essential part of a previously proposed vibration damping apparatus described in the BACKGROUND OF THE INVENTION as a comparative example with the model view shown in FIG. 4.

On the other hand, in a case of the previously proposed vibration damping apparatus described in the BACKGROUND OF THE INVENTION, the structure of stopper 3 takes the structure that an input due to the hit of stopper at bending portion 13 is received at the cantilever. FIG. 7 is a model view of the bending moment acted upon the bending portion in the same way as described in the first embodiment. A difference of the structure related to FIG. 7 from FIG. 4 related to the second embodiment is that the stopper 3 is not fixed on pipe 11. Suppose that bending portion 13 is a bending point B, bending moment acted upon bending point B by means of input F is $M_B$.

$M_B = F \times L1$ - - - (4). From equations (3) and (4), it follows that $M_{B1} < M_B$ - - - (5).

Hence, it will be appreciated that bending moment $M_{B1}$ acted upon bending point B1 in the second embodiment is smaller than bending moment $M_B$ acted upon bending point B in the case of the previously proposed vibration damping apparatus (stopper is the cantilever type). Furthermore, from equations (1) and (4), the following relationship can be introduced. $M_{B1}/M_B = \{L2/(L1+L2)\}^2$ - - - (6). Hence, since $M_{B1}$ becomes smaller than $M_B$ in proportion to a square of a ratio of distance L2, it can be said that $M_{B1}$ becomes smaller remarkably. If distance L2=L1 (namely,input point F is positioned at a center between bending point B1 and fixed end R2), the following relationship (7) is present from equation (6). That is to say, $M_{B1}/M_B = \frac{1}{4}$ - - - (7). Hence, equation (7) can evidence that $M_{B1}$ becomes greatly decreased.

Although, with reference to FIG. 4, bending moment acted upon bending portion 13 in response to input F has been described above, the result of discussion described above can equally be applied to the structure in the first embodiment in which the position to be discussed has the same structure.

Next, a reaction force $R_{R1}$ with respect to input force F acted upon fixed end R1 will be discussed with reference to FIG. 4. As appreciated from FIG. 4, reaction force $R_{B2}$ having the same magnitude as reaction force $R_{B1}$ is acted upon bending point B2 due to a principle of action and reaction when a reaction force $R_{B1}$ with respect to input F, a resultant reaction force $R_{R1}$ acted upon fixed end R1 due to a balance of force between bending point B2 and fixed end R1 is as follows: That is to say, $R_{R1}=R_{B1}$- - - (8).

Figure 5:
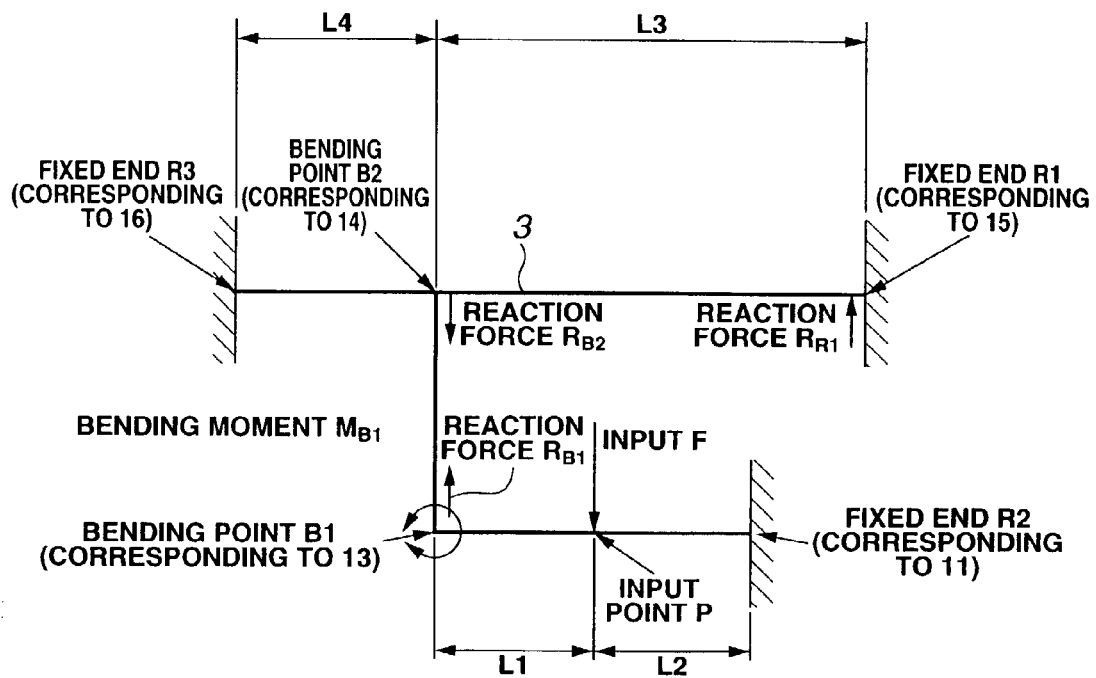
FIG. 5 is a model view of the essential part of the vibration damping apparatus in the first embodiment shown in FIGS. 1A and 1B and FIG. 2.

Next, a reaction force developed on welding nut 15 of bracket 2 in the first embodiment shown in FIG. 2 is considered from a model view as shown in FIG. 5. Suppose that a fixing portion of stopper 3 at which stopper 3 is fixed onto welding nut 16 is fixed end R3 and bending portion 14 is a bending point B2. From a result of discussion I FIG. 4, $R_{B2}=R_{B1}$ - - - (9).

Hence, suppose that bending point B2 is placed at a position at which a distance between fixed ends R1 and R3 is divided into distances L3 and L4. In addition, stopper 3 is assumed to be the beam. The whole vibration damping apparatus in the first embodiment can be thought to be a beam at both ends of which the beam is supported and which has bending point B2 upon which reaction force $R_{B1}$ is acted. Reaction force RR1 acted upon fixed end R1 from a formula of the beam in the field of the strength of materials is determined as follows:

$$R_{R1} = R_{B1} \times \{[L4^2/(L3+L4)^2] \times \{(3 \times L3 + L4)/(L3+L4)\} \quad (10)$$
$$= R_{B1} \times \{(3 \times L3 \times L4^2 + L4^3)/(L3+L4)^3\}$$
$$= R_{B1} \times [(3 \times L3 \times L4^2 + L4^3)/\{(3+L3 \times L4 + L4^3) +$$
$$(3+L3^2 \times L4 + L3^3)\}].$$

Since $(3 \times L3^2 \times L4+L3^3)>0$, $R_{R1}/R_{B2}$ is expressed as follows: that is to say, $R_{R1}/R_{B1}=(3 \times L3 \times L4^2+L4^3)+(3 \times L3 \times L4^2+L4^{3})\}<1$ - - - (11). Hence, since $R_{R1}<R_{B1}$, it will be appreciated from equations (8) and (11) that reaction force $R_{R1}$ acted upon fixed end R1 in the first embodiment becomes smaller than that in the second embodiment.

As described above, reaction force developed on welding nut 15 of bracket 2 can be reduced by installing fixing portion of stopper 3 at which stopper 3 is fixed onto welding nut 16 of bracket 2 at a position more approaching to the engine than bending portion 14.

Next, a third preferred embodiment of the vibration damping apparatus according to the present invention will be described below with reference to FIG. 6.

Figure 6:
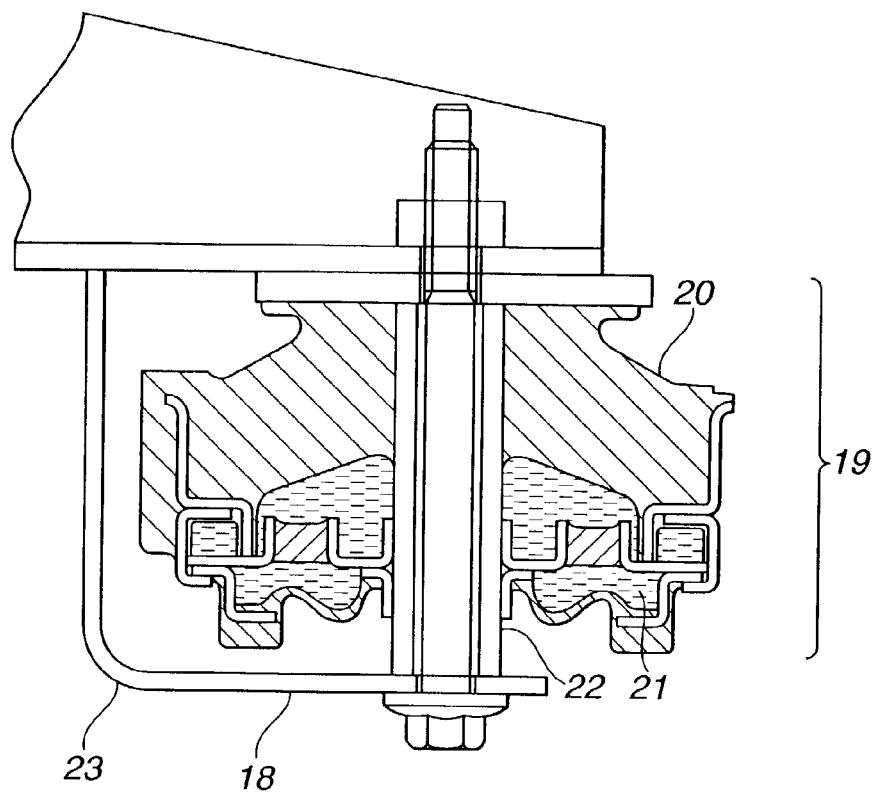
FIG. 6 is a partially cross sectional view of the vibration damping apparatus in a third preferred embodiment according to the present invention at the same position as shown in FIG. 2.

In FIG. 6, stopper 3 is integrated with bracket. In FIG. 6, a reference numeral 18 denotes a stopper integrated bracket (second engine support member), a reference numeral 19 denotes engine mount (the vibration damping support device), a reference numeral 20 denotes the rubber assembly (elastic body portion), a reference numeral 21 denotes a fluid chamber in which a working fluid is filled, a reference numeral 22 denotes a pipe, and a reference numeral 23 denotes a bending portion.

It is noted that, although a fluid mount is described as engine mount 1 in FIG. 6, the present invention is applicable to the fluid mount. However, it is of course that the present invention is applicable to a rubber mount in which no fluid is sealed therein. A bending moment acted upon bending portion 23 of a stopper integrated bracket 18 has the same model view as each of the first and second embodiments (a force and a moment acted upon at a bending point B1 through fixed end R2 are the same) so that the force and moment are the same as those described in each of the first and second embodiments. However, in an operation in which engine mount 1 is fixed onto stopper integrated bracket 18, use of stopper integrated bracket 18 permits an engagement operation with a provisional mount of rubber assembly 20 onto a portion of stopper of stopper integrated bracket 18 rubber assembly 20 fixed onto the stopper. Hence, it becomes unnecessary for an operator to continue to hold rubber assembly 20 with only one hand until such a fixing operation as an engagement operation of bolts. Consequently, the workability of the fixing portion can be improved.

It is noted that, in FIGS. 2 and 3, vehicular body support member 8 and vehicular body part 7 shown in FIG. 1A are omitted for explanation purpose of the essential part of the vibration damping apparatus and the structure in the second embodiment shown in FIG. 3 is the same as that in the first embodiment shown in FIG. 2 except stopper 3 and second fixing portion 16 of bracket 2.

The entire contents of a Japanese Patent Application No. 2001-190672 (filed in Japan on Jun. 25, 2001) are herein incorporated by reference. The scope of the invention is defined with reference to the following claims.

What is claimed is:

1. A vibration damping apparatus for supporting an engine on a vehicular body, comprising:
    an elastic member to damp a vibration developed from the engine;
    a stopper in contact with the elastic member to limit a transmission of a fluctuation developed on the engine therethrough; and
    a vehicular body support member integrated with the elastic member to fix the elastic member on the vehicular body, the elastic member including a stopper fixing portion that is placed at a first position opposite to a second position that is faced toward the engine, the stopper fixing portion fixing the stopper at the first position, and the stopper including a bending portion, one side of the stopper with respect to the bending portion being fixed onto an engine support member and another side of the stopper with respect to the bending portion being fixed onto the stopper fixing portion of the elastic member so as to grasp the elastic member between both sides of the stopper,
    wherein the elastic member comprises a pipe integrated with a rubber, a fixing member being inserted through the pipe to fix the vibration damping apparatus onto the engine support member, one end portion of the pipe being fixed to the engine support member and the stopper fixing portion being located at another end portion of the pipe.

2. A vibration damping apparatus for supporting an engine on a vehicular body as claimed in claim 1, wherein the engine support member is interposed between the engine and the stopper, one side thereof being fixed to the engine and the other side thereof being fixed to the stopper and wherein the bending portion comprises a first bending portion with a boundary of which one side thereof is fixed to the stopper fixing portion of the elastic member and a second bending portion with a boundary of which one side thereof is faced with and fixed onto the engine support member, and wherein the engine support member includes a first fixing portion on which the vibration damping apparatus is fixed and a second fixing portion located at a position adjacent to the second bending portion and spaced apart from the first fixing portion toward an opposite side to the first fixing portion with respect to the second bending portion, the stopper being fixed onto the first and second fixing portions of the engine support member.

3. A vibration damping apparatus for supporting an engine on a vehicular body as claimed in claim 2, wherein the stopper includes an upper plate portion faced toward the engine support member, the upper plate portion being integrated with a lower plate portion fixed onto the stopper fixing portion of the elastic member to form the stopper.

4. A vibration damping apparatus for supporting an engine on a vehicular body as claimed in claim 2, wherein a reaction force acted upon a first fixed end which corresponds to a fixing portion of the stopper at which the stopper is fixed to the other side of the engine support member is smaller than another reaction force acted upon a first bending point which corresponds to the first bending portion, with the stopper assumed to be a beam, a distance from the first fixed end to a second bending point which corresponds to the second bending portion assumed to be L3, and a distance from the second bending point to a third fixed end which corresponds to the second fixing portion at which the stopper is fixed to the engine support member assumed to be L4.

5. A vibration damping apparatus for supporting an engine on a vehicular body as claimed in claim 1, wherein the stopper further comprises a second bending portion with a boundary of which one side of the stopper is fixed on the engine support member, each of the bending portion and the second bending portion being bent substantially through a right angle and wherein the elastic member further comprises a cylindrical rubber assembly fixed around the pipe and a reinforcement fitting to reinforce partially the cylindrical rubber assembly.

6. A vibration damping apparatus for supporting an engine on a vehicular body as claimed in claim 5, wherein a bending moment ($M_{B1}$) at the bending portion is expressed in the following, with an input (F) developed at an input point at which the rubber assembly partially reinforced by the reinforcement fitting is struck on the stopper, the input point dividing a distance of a part of the stopper from the bending portion to a fixed end at which the stopper is fixed to the pipe into L1 and L2: $M_{B1} < F \times L1$.

7. A vibration damping apparatus for supporting an engine on a vehicular body, comprising:
   an elastic member to damp a vibration developed from the engine;
   an engine support member connected to a stopper, the stopper in contact with the elastic member to limit a transmission of a fluctuation developed on the engine therethrough and the engine support member being interposed between the engine and the elastic member; and
   a vehicular body support member connected to the elastic member to fix the elastic member on the vehicular body, the elastic member including a stopper fixing portion that is placed on a first position opposite to a second position faced toward the engine, the stopper fixing portion fixing the stopper at the first position, and the stopper including a bending portion via which the stopper is fixed onto the vehicular body support member at the stopper fixing portion of the elastic member,
   wherein the elastic member comprises a pipe through which a fixing member is inserted to fix the vibration damping apparatus onto the engine support member, one end portion of the pipe being fixed onto the engine support member and the elastic member being fixed to the vehicular body support member.

8. A vibration damping apparatus for supporting an engine on a vehicular body as claimed in claim 7, wherein the elastic member comprises a rubber assembly and a fluid chamber in which a working fluid is filled.

9. A vibration damping apparatus for supporting an engine on a vehicular body as claimed claim 7, wherein the stopper is directly fixed to the vehicular body support member by the stopper fixing portion.

* * * * *